US007346795B2

(12) United States Patent
Klowden et al.

(10) Patent No.: US 7,346,795 B2
(45) Date of Patent: Mar. 18, 2008

(54) DELAYING LANES IN ORDER TO ALIGN ALL LANES CROSSING BETWEEN TWO CLOCK DOMAINS

(75) Inventors: Daniel S. Klowden, Seattle, WA (US); Adarsh Panikkar, Tacoma, WA (US); S. Reji Kumar, University Place, WA (US)

(73) Assignee: Intel Corporation, Santa Clara, CA (US)

(*) Notice: Subject to any disclaimer, the term of this patent is extended or adjusted under 35 U.S.C. 154(b) by 410 days.

(21) Appl. No.: 11/027,775

(22) Filed: Dec. 31, 2004

(65) Prior Publication Data

US 2006/0149987 A1 Jul. 6, 2006

(51) Int. Cl.

| | |
|---|---|
| ***G06F 1/12*** | (2006.01) |
| ***G06F 1/00*** | (2006.01) |
| ***G06F 1/04*** | (2006.01) |
| ***G06F 1/24*** | (2006.01) |
| ***G06F 11/00*** | (2006.01) |

(52) U.S. Cl. ...................... 713/401; 713/400; 713/501; 713/503

(58) Field of Classification Search ................ 713/400, 713/401, 503, 501; 327/292, 296

See application file for complete search history.

(56) References Cited

U.S. PATENT DOCUMENTS

| | | | | |
|---|---|---|---|---|
| 7,009,431 | B2 | 3/2006 | Kolla et al. | |
| 7,043,392 | B2 | 5/2006 | Kolla et al. | |
| 7,051,295 | B2 | 5/2006 | Narendra et al. | |
| 7,054,331 | B1 * | 5/2006 | Susnow et al. | 370/465 |
| 7,103,790 | B2 * | 9/2006 | Rentschler et al. | 713/401 |
| 7,193,429 | B2 * | 3/2007 | Okuyama | 326/26 |
| 2002/0199124 | A1 * | 12/2002 | Adkisson | 713/400 |
| 2005/0129070 | A1 | 12/2003 | Kolla et al. | |
| 2004/0223570 | A1 * | 11/2004 | Adkisson | 375/359 |
| 2004/0225910 | A1 * | 11/2004 | Adkisson | 713/400 |
| 2005/0286565 | A1 | 12/2005 | Vakil et al. | |
| 2006/0050822 | A1 | 3/2006 | Panikkar et al. | |
| 2006/0053328 | A1 | 3/2006 | Panikkar et al. | |
| 2006/0146967 | A1 | 7/2006 | Panikkar et al. | |
| 2006/0149987 | A1 | 7/2006 | Klowden et al. | |

* cited by examiner

*Primary Examiner*—Thomas Lee
*Assistant Examiner*—Jaweed A Abbaszadeh
(74) *Attorney, Agent, or Firm*—Philip A. Pedigo

(57) ABSTRACT

In some embodiments an apparatus and method may comprise a plurality of lanes between two clock domains, each lane comprising circuitry to generate a first signal when the lane may lose cycle coherency with other of the plurality of lanes, generate a second signal to signify a lane has been delayed, and a control circuit coupled with the plurality of lanes to add latency only to lanes that did not generate a second signal if the control circuit detects a first signal from any of the plurality of lanes.

13 Claims, 4 Drawing Sheets

DELAYING LANES IN ORDER TO ALIGN ALL LANES CROSSING BETWEEN TWO CLOCK DOMAINS

BACKGROUND

Electronic devices and systems often represent information by varying electrical parameters such as voltage, current, frequency, wavelength, etc. These electrical parameters may be controlled in many ways, for example, a digital device may vary a voltage amplitude discretely over time while an analog device may vary a voltage amplitude continuously over time. These two variations alone provide limitless ways to represent information.

Digital devices are further differentiated as synchronous or asynchronous. Synchronous devices use periodic synchronization signals, also called clock pulses, to synchronize device circuitry while asynchronous devices are not slaved to a clock. Synchronous signaling is typically less complex and has less overhead than asynchronous signaling, which benefits device performance.

Unfortunately, synchronous devices and systems are susceptible to errors within their clock signals. Ideally, a synchronous system has universal clock signal characteristics such as phase or frequency throughout the entire system. In practice this is not achieved. Some potential sources of error are environmental influences on clocking, clock distribution variations, and signaling between clock domains.

In devices or systems that are synchronized with a clock signal, slight variations in the clock signal often cause malfunctions. If a signal is sampled at a wrong time, data corruption occurs. For example, metastability happens if a data signal transitions too close to or at the same time as a clock transition, therefore causing the data signal to be sampled in an invalid intermediate state. Therefore, in order to reliably sample a data value it must be steady for a brief time before a clock transition through a brief time after a clock transition, also called setup time and hold time, respectively.

When signals are passed between clock domains, from circuitry running on one clock to circuitry running on another clock, asynchronous relationships at the clock domain interface must be reconciled to ensure data integrity. Since each domain is operating on different clocks, numerous sources for error exist. For example, clock domain interfaces may have an unknown phase relationship even if the two clock domains are operating at the same frequency. Therefore data corruption is likely if not otherwise compensated for.

Some architectures have multiple lanes crossing clock domain interfaces, where each lane includes its own data interface, for example, an M-bit interface. These multiple lanes may be in a channel that has the same sending clock and the same receiving clock. Even if multiple lanes crossing between clock domains each can compensate for the asynchronous interface, they may still lose cycle coherency between the lanes, where cycle coherency involves the data across all interfaces releasing in the same sending clock cycle and being captured in the same receiving clock cycle.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, when a plurality of data interfaces cross a clock domain interface, the interfaces may lose cycle coherency between them if any of the interfaces adjust timing to avoid a data corruption at the clock domain interface. The following provides a system, method and apparatus that may maintain cycle coherency between such data interfaces.

Figure 1:
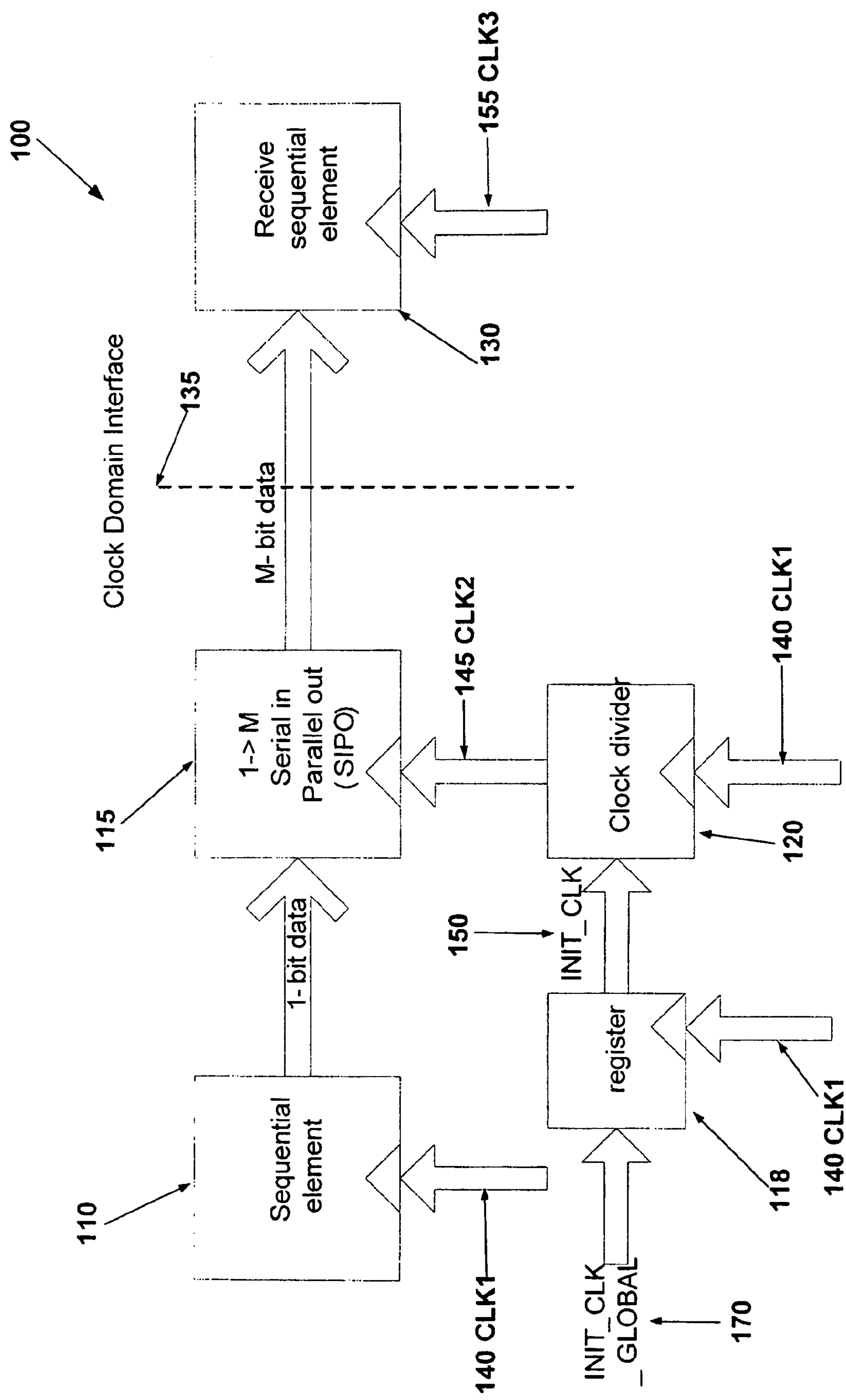
FIG. 1 illustrates a clock domain interface where clock signals have matching frequency but no phase relationship.

FIG. 1 illustrates circuitry 100 distributed on two sides of a clock domain interface 135. In the present example, the circuitry on one side of the clock domain interface 135 includes circuitry to match the clock frequency on the other side of the clock domain interface 135. Even with matching frequencies, the clock domain interface 135 can be asynchronous in phase and therefore increase data corruptions as data crosses the clock domain interface 135.

Referring to the embodiment in FIG. 1, a sequential element 110 is clocked by CLK1 140 and outputs 1-bit data to a serial in parallel out element (SIPO) 115. A clock divider 120 receives CLK1 140 as well as an INIT_CLK signal 150 and divides CLK1 to make a CLK2 signal 145 that may be equal in frequency to a clocking signal on the other side of the clock domain interface 135. The present embodiment includes register 118 that is clocked by CLK1 and that receives an INIT_CLK_GLOBAL signal 170 and outputs the INIT_CLK signal 150 to the clock divider 120.

Although an asynchronous clock alignment can prevent data corruption on a single lane crossing between two clock domains, a data channel between clock domains may comprise multiple data lanes. As stated above, a channel may be a collection of data interfaces with the same receiving clock and the same sending clock. Again, a cycle coherent data channel is therefore a channel where data across all interfaces is released in the same sending clock cycle and is captured in the same receiving clock cycle. Referring to FIG. 1, the signal INIT_CLK_GLOBAL 170 is shared in order to synchronize the frame relationship across lanes.

Referring to the embodiment in FIG. 1, the SIPO 115 is clocked by CLK2 145 and outputs the input 1-bit data from sequential element 110 as M-bit data. The M-bit data may then be sent, for example in an M-bit data frame, at each CLK 2 cycle. If INIT_CLK 150 is deasserted, CLK2 145 initializes to produce a transition, such as a rising edge. By adjusting the CLK2 phase, the data bus can be aligned across the clock domain interface 135. CLK 2 need not be a division of CLK1, it may be larger, smaller or equal, therefore the clock divider 120 is used for illustration purposes. Therefore, the synchronous data may be provided to a clock domain interface at a matching frequency to circuitry on the other side of the clock domain interface.

In the present embodiment, a receive sequential element 130 is clocked by CLK3 155 and receives the M-bit data across the clock domain interface 135 from the SIPO 115. The present embodiment uses 1-bit data and M-bit data, but embodiments of the present invention are not limited to any data width and generally may be applied to any clocked data.

Therefore, the embodiment in FIG. 1 shows a clock domain interface 135 with two clocks, CLK2 145 and CLK3 155, that are equal in frequency but have no phase relationship, and a data bus that traverses the interface 135. In this example, CLK1 140 is divided to produce CLK2 145 which therefore has a synchronous phase relationship to CLK1 140. CLK2 145 is used to clock SIPO 115 to send data from the CLK1 140 domain. This embodiment illustrates phase control of CLK2 145 with an INIT_CLK_GLOBAL signal 170 to synchronize timing of multiple lanes that cross a clock domain interface 135.

There are numerous potential sources of error in synchronous devices. Two potential sources of error that are particularly relevant to the present embodiment involve skew and sampling uncertainty. These become greater considerations as circuit complexity increases. For example, assume a clock domain interface 135 with multiple lanes crossing the interface. In this example, the multiple lanes are sent from a CLK1 140 domain to a CLK3 155 domain as shown in FIG. 1. Furthermore, assume an INIT_CLK_GLOBAL signal 170, as shown in FIG. 1, is shared over the multiple lanes to maintain cycle coherency over the clock domain interface 135. This example highlights at least two potential skew problems and two sampling uncertainties.

At least two distribution skews reduce timing reliability in the present example. Basically, there may be distribution skew between the lanes in the sending and in the receiving clock domains. For instance, even though each lane has the same CLK1 140 distribution skew between the lanes is likely. As a matter of fact, there could even be no phase relationship between the lanes. As stated above, there may be distribution skew associated with CLK3 155 between the lanes as well.

There are also at least two sampling uncertainties in the present example. First, the signal INIT_CLK_GLOBAL 170 is shared across lanes and is sampled into each lane's CLK1 domain, therefore there is one CLK1 140 cycle of uncertainty for the INIT_CLK_GLOBAL signal 170. Second, when CLK3 is sampled onto the CLK1 domain, there is also an uncertainty of one CLK1 cycle. These four factors present the problem shown in FIG. 2.

Figure 2:
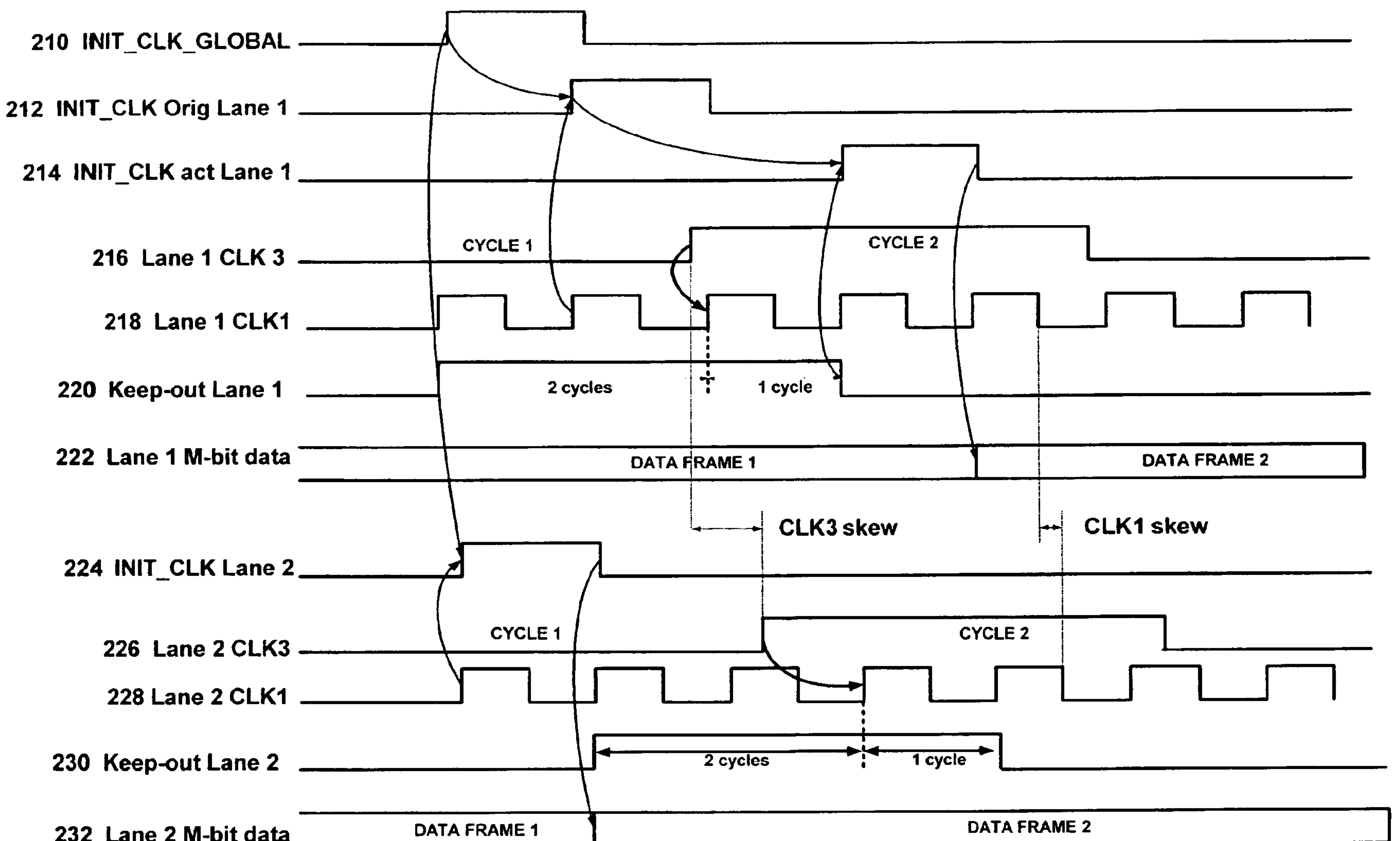
FIG. 2 illustrates a cycle offset between two lanes.

FIG. 2 illustrates a timing diagram for two lanes, and in particular, a cycle offset between the two lanes. Each lane has a CLK1 and CLK3 but they are slightly skewed between the lanes. Both lanes initially have no data skew between them.

Each lane comprises multiple signals. The first lane includes the top seven signals in the figure. The first lane therefore includes an INIT_CLK_GLOBAL signal 210, an original INIT_CLK Lane 1 signal 212, and actual INIT_CLK Lane 1 signal 214, a Lane 1 CLK3 signal 216, a Lane 1 CLK1 signal 218, a Keep-out Lane 1 signal 220 and a Lane 1 M-bit data signal 222. The second lane includes the bottom five signals in the figure. The first lane therefore includes an INIT_CLK Lane 2 signal 224, a Lane 2 CLK 3 signal 226, a Lane 2 CLK1 signal 228, a Keep-out Lane 2 signal 230 and a Lane 2 M-bit data signal 232.

Generally, any timing change of one lane without a corresponding change in another lane will result in a loss of cycle coherency between the lanes. FIG. 2 shows a INIT_CLK pulse occurring for a first lane during a CLK 3 pulse which would result in a data corruption, while an INIT_CLK pulse occurs in a second lane before a corresponding CLK3 pulse. In the present example, the setup and hold times bounding the CLK3 pulse are bounded by a Keep-out signal that prevents the corresponding INIT_CLK signal from occurring. As shown in the present example, if one lane avoids a data corruption by delaying the sending of data while another lane does not delay, then cycle coherency between the lanes is disrupted.

Referring now to FIG. 2, the timing relationships between the signals is analyzed in more detail. The signal INIT_CLK_GLOBAL 210 is sampled into each lane's CLK1 domain, as shown with solid arrows. A Keep-out signal 220 is generated from sampling the CLK3 signal into the CLK1 domain for each lane. For Lane 1, the INIT_CLK Original signal 212 rises during the Lane 1 Keep-out region, which delays both the frame alignment and the data until after the Keep-out region ends. This is shown by INIT_CLK actual 214 and Lane 1 M-bit data 222. Furthermore, notice that with the data delayed, Data Frame 1 from Lane 1 M-bit data 222 will be captured on the Lane 1 CLK3 rising edge after Cycle 2.

For Lane 2, the original and actual INIT_CLK 224 are the same since the signal asserts outside of the Lane 2 Keep-out region shown in the Keep-out Lane 2 signal 230.

Therefore, frame alignment occurs such that Data Frame 2 will be captured on the Lane 2 CLK3 rising edge before Cycle 2.

In this example, Data Frame 1 for each of the two lanes is off by 1 CLK3 cycle due to only one lane delaying, thus resulting in loss of cycle coherency between the lanes. In this example, to maintain cycle coherency between lanes, when INIT_CLK_GLOBAL 210 asserts within the Keep-out region of any lane and that lane's data is pushed into the next CLK3 cycle, one CLK3 cycle worth of latency is added to any lane that did not push into the next cycle.

It is not always the case that other lanes need to be delayed to maintain cycle coherency across multiple lanes when at least one of the lanes is delayed. For example, if a lane is only delayed for a relatively short time, it is possible to hamper cycle coherency by delaying other lanes into a subsequent cycle. An embodiment may correct for this with two status signals for each lane and therefore adjust timing only when it promotes cycle coherency.

An embodiment may more effectively maintain cycle coherency by not adjusting lane timing for other lanes when a lane is delayed for a relatively short time. This can be accomplished with two signals: a first signal to signify the lane may lose cycle coherency with other lanes, and a second signal to signify a lane has been delayed. In reference to other embodiments in the above description, an embodiment may use a NEW_CYCLE signal to assert when the lane's INIT_CLK signal asserts within the start of the Keep-out region, and a FRAME_MOVED signal to assert when a lane's INIT_CLK signal asserts anywhere within the Keep-out region. This may include the cycle where the keep-out region transitions high and low.

In an embodiment, a control unit can then use the following algorithm to align the lanes. If any lane has NEW_CYCLE asserted, add 1 CLK3 cycle of latency to all lanes that do not have FRAME_MOVED asserted. Applying the algorithm to the example shown in FIG. 2 would result in lane 1 asserting the NEW_CYCLE signal, while Lane 2 would not assert either NEW_CYCLE or FRAME_

MOVED, and 1 additional CLK3 cycle of latency would therefore be added to Lane 2.

The present embodiment uses two signals for the following reasons. CLK3 cycles need to be added to a lane mainly when one lane falls in the beginning of the Keep-out region, possibly leaving another lane behind. To contrast, when a lane that falls at the end of the Keep-out region with another lane falling just after it, both already in the same cycle. In the present embodiment, the NEW_CYCLE signal is used to distinguish between these two events. Furthermore, if all lanes fall in a Keep-out region, no CLK3 cycles should be added to any lane even if one lane asserts NEW_CYCLE. This is the reason for having a FRAME_MOVED signal. In the present embodiment the logic to generate these signals is distributed between the CLK3 and the CLK1 domains, although all the logic could be in one domain.

As referred to above, an embodiment may use a NEW_CYCLE signal to assert when the lane's INIT_CLK signal asserts within the start of the Keep-out region, and a FRAME_MOVED signal to assert when a lane's INIT_CLK signal asserts anywhere within the Keep-out region. Furthermore, an embodiment may use a NEW_CYCLE signal to assert when the lane's INIT_CLK signal asserts within the first X CLK1 cycles of the Keep-out region, where X is an adjustable number of CLK1 cycles. In this example, the value X is the amount of time within the Keep-out region that if INIT_CLK asserts, NEW_CYCLE would rise. In this case, both INIT_CLK and the Keep-out signal are synchronous to the CLK1 domain, therefore it is reasonable for the value X to be in terms of CLK1 cycles.

The X value in this embodiment may be determined in any of numerous ways. For example, X may be calculated by the equation:

$$X=\alpha+\beta$$

where $\alpha$=cycle uncertainty due to the INIT_CLK_GLOBAL sampling, and $\beta$=Cycle uncertainty due to the CLK3 sampling.

In this example, $\alpha$ may be calculated by CLK1=1+(INIT_CLK_GLOBAL skew between lanes)/CLK1 period, and p may be calculated by CLK1=1+(CLK3 skew between lanes)/CLK1 period. According to this equation, the minimum value of X is 2 CLK1 cycles. In this example X only increases when the INIT_CLK_GLOBAL or CLK3 skew is above 1 CLK1 period. The present example therefore maintains cycle coherency by not adjusting lane timing for other lanes when a lane is delayed for a relatively short time.

The preceding description provides a detailed example of the proper window at the start of a Keep-out region that we have to compensate for to maintain cycle coherency for multiple lanes across a clock domain interface. The subsequent paragraphs detail an example use of that window to adjust signals to maintain cycle coherency.

Figure 3:
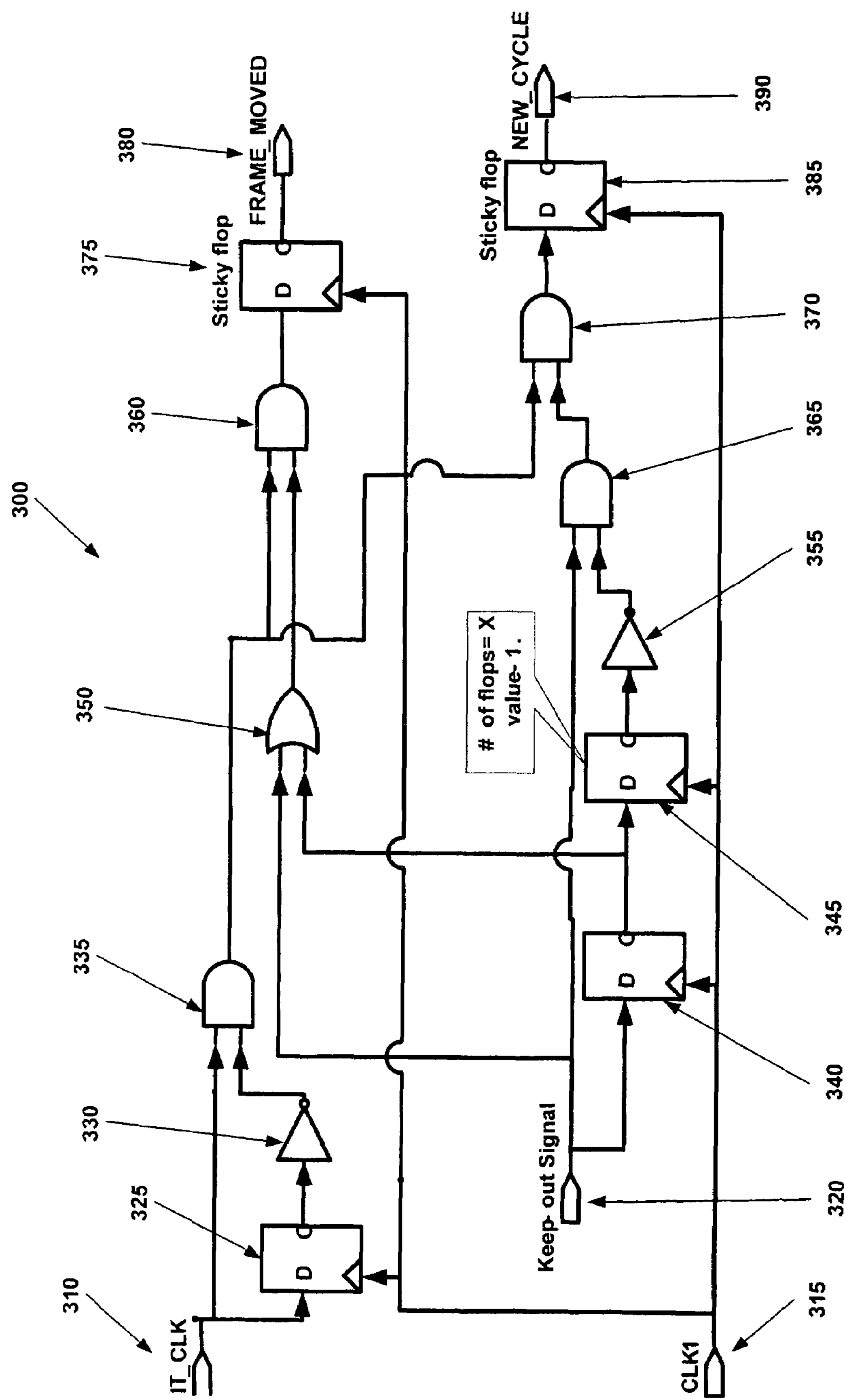
FIG. 3 illustrates a logic implementation of control signals for cycle coherency protection of multiple lanes crossing a clock domain interface.

FIG. 3 illustrates an example logic 300 to generate a first signal to signify the lane may lose cycle coherency with other lanes, and a second signal to signify a lane has been delayed. In the present embodiment, these are the FRAME_MOVED and NEW_CYCLE signals. In logic 300, the FRAME_MOVED and NEW_CYCLE signals are generated from the INIT_CLK and Keep-out signals and the X value in a previously described embodiment.

Referring to FIG. 3, INIT_CLK 310 is input into a sticky flop 325 and an AND gate 335. Sticky flop 325 is clocked by CLK1 315 and outputs to an inverting element 330. The output of the inverting element 330 is then input into AND gate 335. This initial circuitry to logic 300 creates a pulse of 1 CLK1 pulse width when INIT_CLK asserts. The output of AND gate 335 is input into AND gate 360 and also into AND gate 370.

Also in FIG. 3, the Keep-out signal 320 is input into a series of sticky flops 340, 345, etc., that is equal in number to the X value previously discussed. The Keep-out signal 320 is also input into AND gate 365. The output of the last sticky flop, in this case flop 345, is then input into an inverter 355 and the output of the inverter is then input into AND gate 365.

Additionally, the Keep-out signal 320 is also OR'ed with the output of the first sticky flop in the series, in this case sticky flop 340, at OR gate 350, and the output is input to AND gate 360. Therefore the output of the OR gate 350 is going to assert high when the Keep-out signal goes high and it is going to stay high until 1 cycle after the pulse.

Continuing the description of logic 300, AND gate 360 outputs into a sticky flop 375 which is clocked by CLK1 315 and which outputs the FRAME_MOVED signal 380. The output of AND gate 365 is input into AND gate 370 and is therefore combined with the output of AND gate 335. The output of AND gate 370 is then input into sticky flop 385 which is clocked by CLK1 and has NEW_CYCLE 390 as an output.

Logic 300 will therefore assert the FRAME_MOVED signal 380 if INIT_CLK 310 is asserted any time during the Keep-out signal 320. Also, logic 300 will assert the NEW_CYCLE signal 390 if INIT_CLK 310 triggers during the pulse region at the beginning of the Keep-out signal 320. The pulse region in the present example is determined by the X value detailed above.

An embodiment may be a method to maintain channel cycle coherency for a multiple lane interface between two clock domains, comprising receiving a first signal from at least one of a plurality of lanes, the first signal representing that lane was delayed, receiving a second signal from at least one different lane representing that different lane has been delayed, and delaying any lane that did not generate a second signal and that would otherwise cause channel cycle incoherency if not delayed. An embodiment may further comprise delaying no lanes when all lanes generate a second signal representing each respective lane has been delayed.

An embodiment may comprise compensating for clock skew with a variable control that adjusts a parameter for when the first signal is asserted. In this embodiment compensating for clock skew with a variable control may happen where the parameter is in clock cycles of the faster clock domain. The present embodiment may further comprise compensating for clock skew with a variable control by compensating only when skew is larger than one clock cycle of the faster clock domain.

Figure 4:
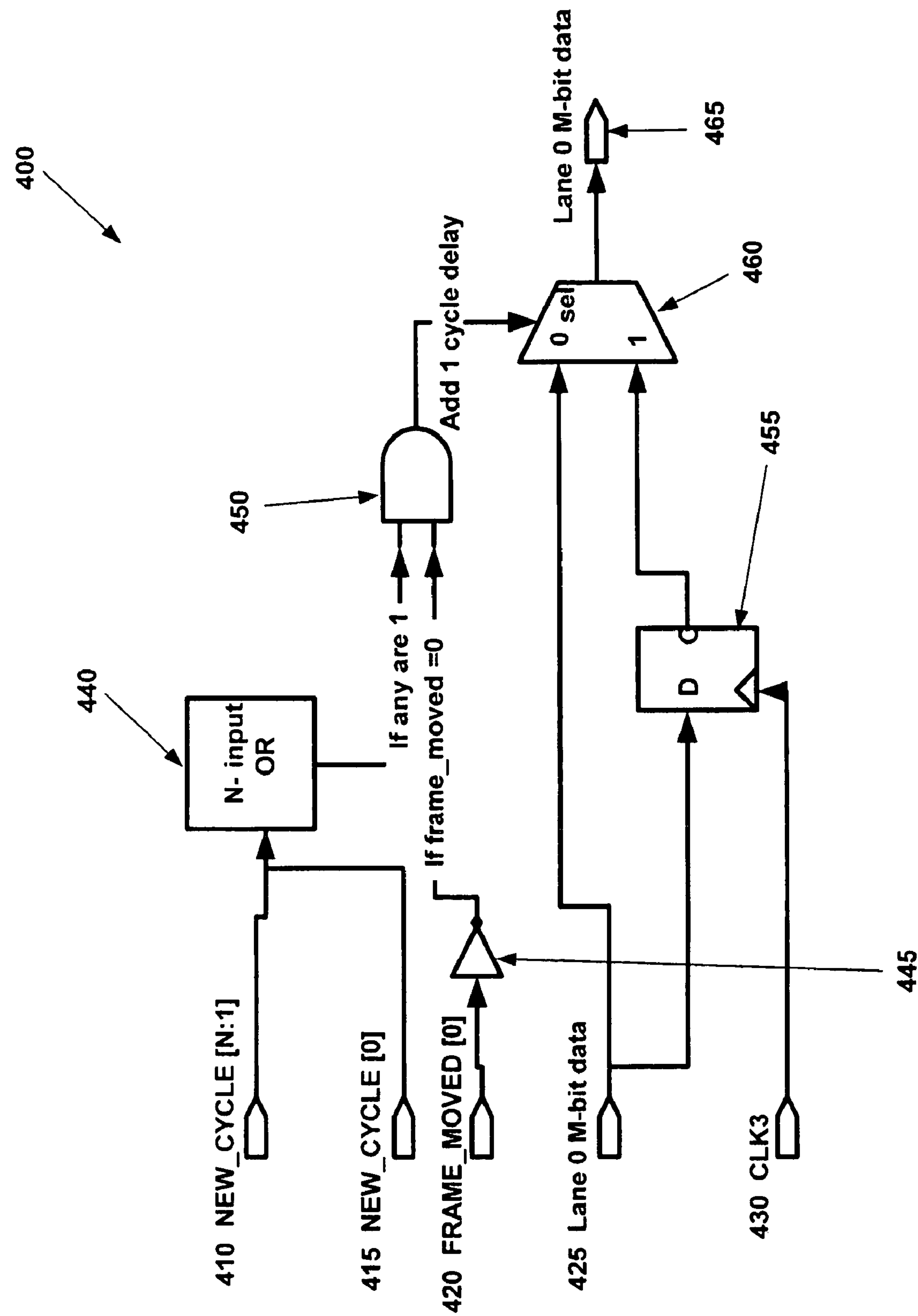
FIG. 4 illustrates logic to add a clock cycle of delay to a datapath.

FIG. 4 shows logic 400 to receive signals output from logic 300 in FIG. 3, and to maintain cycle coherency across multiple lanes. Logic 400 receives N different NEW_CYCLE signals 410-415, a FRAME_MOVED signal 420, a lane of data 425, and in the present example is clocked by CLK3 430.

Referring to FIG. 4, an N-input OR gate 440 receives the N different NEW_CYCLE signals 410-415 and outputs a 1 if any of the signals are asserted. In the present embodiment, logic 400 resides in each lane with the exception of the N-input OR gate 440 which is common to every lane. The FRAME_MOVED signal 420 is inverted at 445 and is input into AND gate 450 along with the output of the N-input OR gate 440. This top portion of logic 400 determines if a data path should be delayed or not. When any NEW_CYCLE signal 410-415 is asserted and when FRAME_MOVED 420 is not asserted, AND gate 450 will assert high to signify delay should be added.

The bottom portion of logic 400 implements the delay in the following manner. The M-bit data 425 is input to a multiplexer 460 and into a sticky flop 455 that is clocked by CLK3 430. Flop 455 outputs to the multiplexer 460 the data but with one CLK3 cycle of delay. Multiplexer 460 is selected by the output of AND gate 450 and outputs the Lane 0 M-bit data 465. The output data 465 will thus have delay for any lane when any NEW_CYCLE signal 410-415 is asserted and when FRAME_MOVED 420 for that lane is not asserted.

An embodiment may comprise a first element to receive a plurality of first signals and to logically OR the first signals, an inverter to receive and invert a second signal, a second element coupled with the output of the first element and the output of the inverter and to logically AND the outputs, a data lane to provide data, the data lane split into a first channel and a second channel, the first channel to provide the same data as a second channel and the second channel to add a delay to the data, and a multiplexer coupled with the output of the second element, the multiplexer to select between the first channel and the second channel based upon the output of the second element, and to output the data from the selected channel. In this embodiment, the circuitry may select the delayed second channel when the second signal is asserted high and any one of the plurality of first signals is asserted high. In an embodiment, the second channel delay may be equivalent to one clock cycle. This embodiment may further have the second channel add delay with a sticky flop. In an embodiment the data lane may be a multiple bit data lane.

An embodiment comprising a plurality of lanes between two clock domains, each lane comprising circuitry to generate a first signal when the lane may lose cycle coherency with other of the plurality of lanes and to generate a second signal to signify a lane has been delayed, as well as a control circuit coupled with the plurality of lanes, the control circuit to add latency only to lanes that did not generate a second signal if the control circuit detects a first signal from any of the plurality of lanes. Furthermore, in an embodiment the lanes may be multiple bit data lanes. In an embodiment the added latency may be one clock cycle of latency. In an embodiment the one clock cycle of latency may be a clock cycle from the slower of the two clock domains. Also, in an embodiment the control circuit may reside in a slower clock domain.

In an embodiment logic 400 resides in the CLK3 domain, but it may reside in either domain or even partly in both domains. Additionally, the present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A system comprising:

a plurality of lanes coupling two clock domains, each lane comprising circuitry to:
- generate a first signal when the lane may lose cycle coherency with other of the plurality of lanes; and
- generate a second signal to signify a lane has been delayed; and a control circuit coupled with the plurality of lanes, the control circuit to add latency only to lanes that did not generate a second signal if the control circuit detects a first signal from any of the plurality of lanes to enable data to be transferred across each lane in the same sending clock cycle.

2. The system of claim 1 wherein the lanes are multiple bit data lanes.

3. The system of claim 1 wherein the lanes are single bit data lanes.

4. The system of claim 1 wherein the added latency is one clock cycle of latency.

5. The system of claim 4 wherein the one clock cycle of latency is a clock cycle from the slower of the two clock domains.

6. A system according to claim 1 wherein the control circuit resides in the slower clock domain.

7. The system of claim 1 wherein the clock domains have an asynchronous phase relationship.

8. An apparatus comprising:

a first element to receive a plurality of first signals and to logically OR the first signals;

an inverting element to receive and invert a second signal;

a second element coupled with the output of the first element and the output of the inverting element and to logically AND the outputs, wherein an output of the second element is to indicate whether a lane may lose cycle coherency with one or more associated lanes of an interface;

a data lane to provide data, the data lane split into a first channel and a second channel, the first channel to provide the same data as the second channel and the second channel to add a delay to the data; and a multiplexer coupled with the output of the second element, the multiplexer to select between the first channel and the second channel based upon the output of the second element, and to output the data from the selected channel.

9. The apparatus of claim 8 wherein the apparatus to select the delayed second channel when the second signal is asserted high and any one of the plurality of first signals is asserted high.

10. The apparatus of claim 8 wherein the second channel delay is equivalent to one clock cycle.

11. The apparatus of claim 8 wherein the second channel adds delay with a sticky flop.

12. An apparatus according to claim 8, wherein the data lane is a multiple bit data lane.

13. An apparatus according to claim 8, wherein the data lane is a single bit data lane.

* * * * *